US008392010B2

United States Patent
Kang et al.

(10) Patent No.: US 8,392,010 B2
(45) Date of Patent: Mar. 5, 2013

(54) METHOD FOR CONTROLLING CRITICAL DIMENSION IN SEMICONDUCTOR PRODUCTION PROCESS, AND SEMICONDUCTOR MANUFACTURING LINE SUPPORTING THE SAME

(75) Inventors: Eugene Kang, Yongin (KR); Won-Hyouk Jang, Yongin (KR); Joo-Hwa Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 266 days.

(21) Appl. No.: 12/912,935

(22) Filed: Oct. 27, 2010

(65) Prior Publication Data

US 2011/0224819 A1    Sep. 15, 2011

(51) Int. Cl.
*G06F 19/00* (2011.01)
*G05B 13/02* (2006.01)

(52) U.S. Cl. .............. 700/110; 700/30; 700/31; 700/44; 700/121

(58) Field of Classification Search .............. 700/28–31, 700/44, 103, 104, 108–110, 121
See application file for complete search history.

(56) References Cited

U.S. PATENT DOCUMENTS

| 7,472,748 | B2 * | 1/2009 | Gdanski et al. | 166/250.1 |
| 7,493,185 | B2 * | 2/2009 | Cheng et al. | 700/108 |
| 7,657,339 | B1 * | 2/2010 | Retersdorf | 700/121 |
| 2008/0109100 | A1 * | 5/2008 | Macharia et al. | 700/110 |
| 2011/0276164 | A1 * | 11/2011 | Bourg et al. | 700/104 |
| 2011/0288660 | A1 * | 11/2011 | Wojsznis et al. | 700/30 |

FOREIGN PATENT DOCUMENTS

| JP | 2007281248 | | 10/2007 |
| KR | 1020030019622 | A | 3/2003 |
| KR | 1020040014511 | A | 2/2004 |
| KR | 1020040103897 | A | 12/2004 |
| KR | 1020070048736 | A | 5/2007 |
| KR | 1020080077708 | A | 8/2008 |
| KR | 1020090119859 | | 11/2009 |

* cited by examiner

*Primary Examiner* — Crystal J Barnes-Bullock
(74) *Attorney, Agent, or Firm* — Robert E. Bushnell, Esq.

(57) ABSTRACT

A critical dimension controlling method in a semiconductor production process includes determining whether a model is to undergo a discontinuous production process when a run is inserted in a semiconductor manufacturing line, applying an offset for said model or a common offset for a model group including said model according to the determination, executing a production process in dependence upon a process variation along with the offset for the model or the common offset for the model group, and measuring an actual critical dimension in the production process. The offset for the model is calculated based on a previously measured actual critical dimension, and the calculated offset for the model is applied to the calculation of the common offset for the model group.

16 Claims, 4 Drawing Sheets

METHOD FOR CONTROLLING CRITICAL DIMENSION IN SEMICONDUCTOR PRODUCTION PROCESS, AND SEMICONDUCTOR MANUFACTURING LINE SUPPORTING THE SAME

CLAIM OF PRIORITY

This application makes reference to, incorporates into this specification the entire contents of, and claims all benefits accruing under 35 U.S.C. §119 from an application earlier filed in the Korean Intellectual Property Office on Mar. 9, 2010, and there duly assigned Serial No. 10-2010-0021000.

BACKGROUND OF THE INVENTION

1. Field of the Invention

The present invention relates to a method for controlling a critical dimension in a semiconductor production process, and a semiconductor manufacturing line therefore. More particularly, the present invention relates to a critical dimension controlling method and a semiconductor manufacturing line therefore in a semiconductor production process that can be applied to a continuous production process and a discontinuous production process.

2. Description of the Related Art

Various and remarkable production processes have been developed as manufacturing industry techniques are developed. Particularly, many inputs are required for minutely control a critical dimension to correctly manufacture semiconductor wafers in a semiconductor production process.

The above information disclosed in this Background section is only for enhancement of understanding of the background of the invention and therefore it may contain information that does not form the prior art that is already known in this country to a person of ordinary skill in the art.

SUMMARY OF THE INVENTION

It is therefore an aspect of the present invention to provide an improved method to control a critical dimension and an improved semiconductor manufacturing line therefore.

It is another aspect of the present invention to provide a critical dimension controlling method and a semiconductor manufacturing line therefore that are capable of efficiently controlling a critical dimension in a semiconductor production process in which a continuous production process and a discontinuous production process are used together.

According to one or more embodiments of the present invention, a critical dimension controlling method in a semiconductor production process includes determining whether a model is to undergo a discontinuous production process when a run is inserted in a semiconductor manufacturing line, applying an offset for said model or a common offset for a model group including said model according to the determination, executing a production process in dependence upon a process variation along with the offset for the model or the common offset for the model group, and measuring an actual critical dimension in the production process. The offset for the model may be calculated based on a previously measured actual critical dimension, and the calculated offset for the model is applied to the calculation of the common offset for the model group.

The common offset may be calculated by a difference between the calculated offset for the model and a model offset deviation.

The model offset deviation may be calculated by a difference between an offset of a reference model in the model group and the offset of said model.

The critical dimension controlling method may further include calculating an offset for the discontinuous production process in dependence upon the common offset and the model offset deviation.

The offset for the discontinuous production process may be calculated as the sum of the common offset and the model offset deviation.

The model group may be a group of models producing a same layer or a same element having a same target critical dimension in the discontinuous production process.

The determination of whether the model is to undergo the discontinuous production process may be performed with reference to a time interval between the insertion of the run and an insertion of a previous run.

The measured actual critical dimension and the calculated offset for the model may be stored in a memory.

The process variation may be calculated in dependence upon the calculated offset for the model and a target critical dimension.

According to another embodiment of the present invention, a semiconductor manufacturing line includes a process tool executing a semiconductor production process, a measuring tool obtaining measurement data in a process result of the semiconductor production process, and a controller controlling the process tool and the measuring tool. The controller determines whether a model is to undergo a discontinuous production process when a run is inserted in a semiconductor manufacturing line, and applies an offset for the model or a common offset for a model group including said model, according to the determination. The offset for the model is calculated based on a previously obtained measurement data, and the calculated offset for the model is applied to the calculation of the common offset for the model group.

The controller may calculate the common offset by a difference between the calculated offset for the model and a model offset deviation.

The controller may calculate the model offset deviation by a difference between an offset of a reference model that is the reference in the model group and the offset of for said model.

The controller may calculate an offset for the discontinuous production process as the sum of the common offset and the model offset deviation.

The controller may determine whether the model is to undergo the discontinuous production process with reference to a time interval between the insertion of the run and an insertion of a previous run.

The controller may calculate a process variation satisfying a target critical dimension in dependence upon the calculated offset for the model and the target critical dimension. The process tool may execute the semiconductor production process in dependence upon the process variation.

The semiconductor manufacturing line may further include a memory storing the measurement data and the calculated offset for the model.

Although a plurality of models having critical dimensions with different targets undergo the continuous or discontinuous production process, the change of the previous process is reflected to obtain an optimized process condition such that the error along with the critical dimension may be minimized, and thereby reducing the time and cost generated in the initial period of the production restart.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
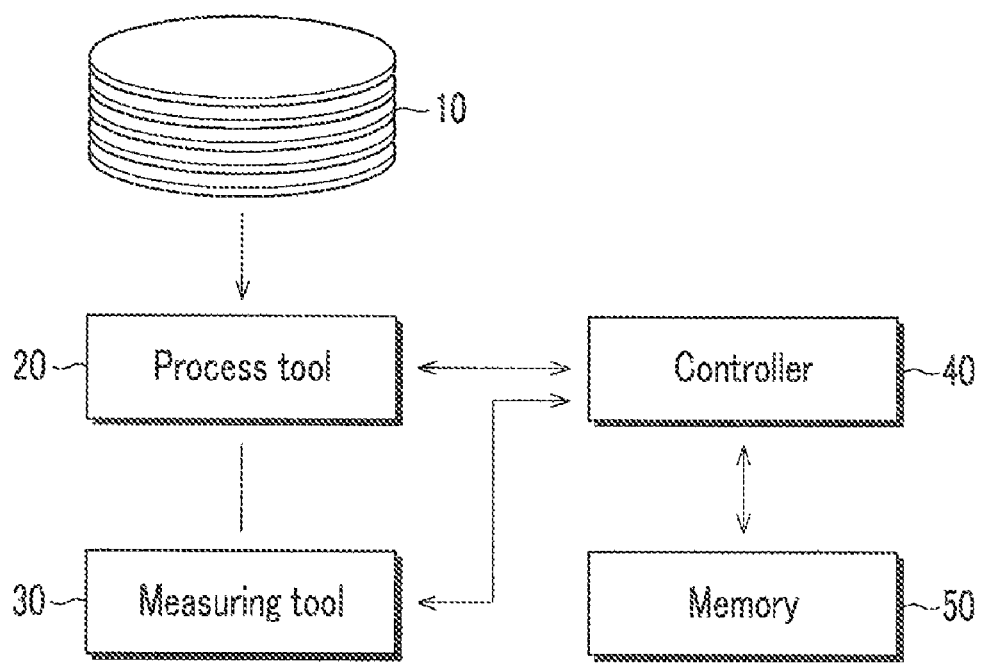
FIG. 1 is a schematic block diagram of a semiconductor manufacturing line as an embodiment according to the principles of the present invention.

A semiconductor production process includes various processes such as single crystalline growth, silicon ingot cutting, wafer surface polishing, circuit design, mask manufacturing, an oxidation process, photoresist coating, an exposure process, a development process, an etching process, an ion implantation process, a chemical vapor deposition (CVD) process, a metallization process, an Electrical Die Sort (EDS) test, sawing, die bonding, wire bonding, and molding. Each process uses an independent and different controlling method.

The single crystalline growth is a process in which a single crystalline silicon ingot is grown while a seed crystal contacts a refined silicon solution of high purity and rotates.

The silicon ingot cutting is a process in which the grown silicon ingot is cut into a wafer having a uniform and thin thickness. Wafers of 3 inch, 4 inch, 6 inch, 8 inch, and 12 inch sizes are manufactured according to a gauge.

The wafer surface polishing is a process in which one surface of the wafer is polished to be like a mirror surface, such that a circuit pattern may be formed on the polished surface.

Circuit design is a process in which an electronic circuit and a circuit pattern to be actually painted on the wafer are designed by using a computer aided design (CAD) system.

Mask manufacturing is a process in which the designed circuit pattern is painted on a glass plate to make a mask.

The oxidation process is a process in which oxygen or vapor reacts with the silicon wafer surface at a high temperature of 800° C.-1200° C. to form a thin and uniform silicon oxide ($SiO_2$) layer.

The photoresist coating is a process in which a photoresist solution that is sensitive to light is uniformly coated on the wafer surface.

The exposure process is a process in which light passes through a circuit pattern on a mask, such that the circuit pattern is formed on the wafer on which photoresist solution is formed.

The development process is a process in which a layer of the photoresist solution receiving the light in the wafer surface is developed.

The etching process is a process in which an unnecessary portion of the wafer is selectively removed by using a chemical material or a reactivity gas to form the circuit pattern.

The ion implantation process is a process in which impurities in the form of minute gas particles are accelerated to reach and infiltrate into the wafer having the circuit pattern, such that the portion of wafer that is infiltrated with the particles has the characteristic of an electrical element. The ion implantation may be replaced by a diffusion process in which impurity particles are diffused into the wafer in an electrical furnace at a high temperature.

The chemical vapor deposition process is a process in which particles formed by a chemical reaction between reaction gases are deposited on the wafer surface to form an insulating layer or an electrically conductive layer.

The metallization process is a process to connect the electrical circuit formed in the wafer surface to an aluminum line. The aluminum line may be replaced with a copper line.

The EDS test is a process in which the electrical operation of IC chips formed in the wafer is tested by a computer to automatically detect a defective product.

The sawing is a process in which the wafer is cut by using a diamond saw to separate many chips on the wafer from each other.

The die bonding is a process in which the chips determined as normal products among the separated chips through the EDS test are attached to a lead frame.

The wire bonding is a process in which external terminals inside the chips are connected to terminals of the lead frame through gold lines.

The molding is a process of sealing the lead frame formed with the chips with a chemical resin to protect the connection gold lines, and thereby the semiconductor element is finally completed.

As well as the above-described processes, the semiconductor manufacturing process may further include a plurality of processes according to the semiconductor element.

There are various negative influences such as a starting influence of a manufacturing apparatus, a memory influence of a manufacturing chamber, and a mismatching influence of a process module. Critical dimension control of the photolithography is one of the process steps receiving the negative influences.

The critical dimension controlling is a process in which a semiconductor manufacturing ran is processed, and measured data is obtained from the processed semiconductor run to determine a final critical dimension. In the present specification and the pending claims, a semiconductor manufacturing run (also referred to as "run") refers to a group of semiconductor wafers to be processed in a semiconductor manufacturing line. An amended process is executed through feedback of the final critical dimension.

In the past, a process error is analyzed several times a month, and the process condition of the process tool is manually updated according to the analysis result. Recently, however, as semiconductor wafer chips are becoming further minute and various, the critical dimension is increasingly smaller and the amendment process is frequently executed.

Also, a plurality of process models having different target critical dimensions are produced in one manufacturing line. In the present specification and the pending claims, a "model" refers to a model of a semiconductor having a critical dimension, and a "group of models" refers to a group of models having a same layer or a same large critical dimension. In many cases, a process is stopped and restarted. In the present specification and the pending claims, a continuous process refers to a production process in which semiconductor runs for the same process model are continuously provided and processed, and a discontinuous process refers to a production process which is stopped and restarted. Whenever a model having a target critical dimension different from the previous model processed in the same manufacturing line, is processed, the determination of the process tool must be adjusted. Also, if a process change generated in the discontinuous production period is not reflected when the production process is restarted, the initial critical dimension may generate a large error for the target critical dimension. Accordingly, the product yield may be deteriorated, and the process tool must be operated until the product of the predetermined standard is produced such that loss of time and cost are generated.

Hereinafter, several embodiments of the present invention have been shown and described in detail such that they can be easily performed by those skilled in the art with reference to the accompanying drawings. The present invention may be modified in various different ways, and is not limited to embodiments described herein.

Further, in the embodiments, like reference numerals designate like elements throughout the specification representatively in a first embodiment, and only elements other than those of the first embodiment will be described.

Descriptions of parts not relating to the present invention are omitted, and like reference numerals designate like elements throughout the specification.

In throughout specification, unless explicitly described to the contrary, the word "comprise" and variations such as "comprises" or "comprising" will be understood to imply the inclusion of stated elements but not the exclusion of any other elements.

FIG. 1 is a block diagram of a semiconductor manufacturing line as an embodiment according to the principles of the present invention.

Referring to FIG. 1, a semiconductor manufacturing line includes a process tool 20 processing a provided run 10, a measuring tool 30 measuring a process result, a controller 40 controlling the processing and the measuring of the run 10, and a memory 50.

Run 10 refers to a group of semiconductor wafers to be processed in the semiconductor manufacturing line. For example, one run of twenty-five (25) wafers may be processed as a single run unit for wafer processing.

Process tool 20 refers to a piece of equipment or a management apparatus of the equipment to execute a production process. The production process is one or more complex processes among a plurality of processes included in the semiconductor manufacturing process as described previously.

Hereafter, the production process includes at least one among the various processes included in the semiconductor manufacturing process such as single crystalline growth, silicon ingot cutting, wafer surface polishing, circuit design, mask manufacturing, an oxidation process, photoresist coating, an exposure process, a development process, an etching process, an ion implantation process, a chemical vapor deposition (CVD) process, a metallization process, an EDS test, sawing, die bonding, wire bonding, and molding. Each production process uses an independent and different controlling method, and further includes a critical dimension controlling process for controlling a final critical dimension by obtaining a measurement data from a semiconductor wafer produced by the production process.

For example, when the production process is a process for forming patterns such wet etching or dry etching, the critical dimension controlling method may be performed by measuring a critical dimension in a photolithography process.

Figure 4:
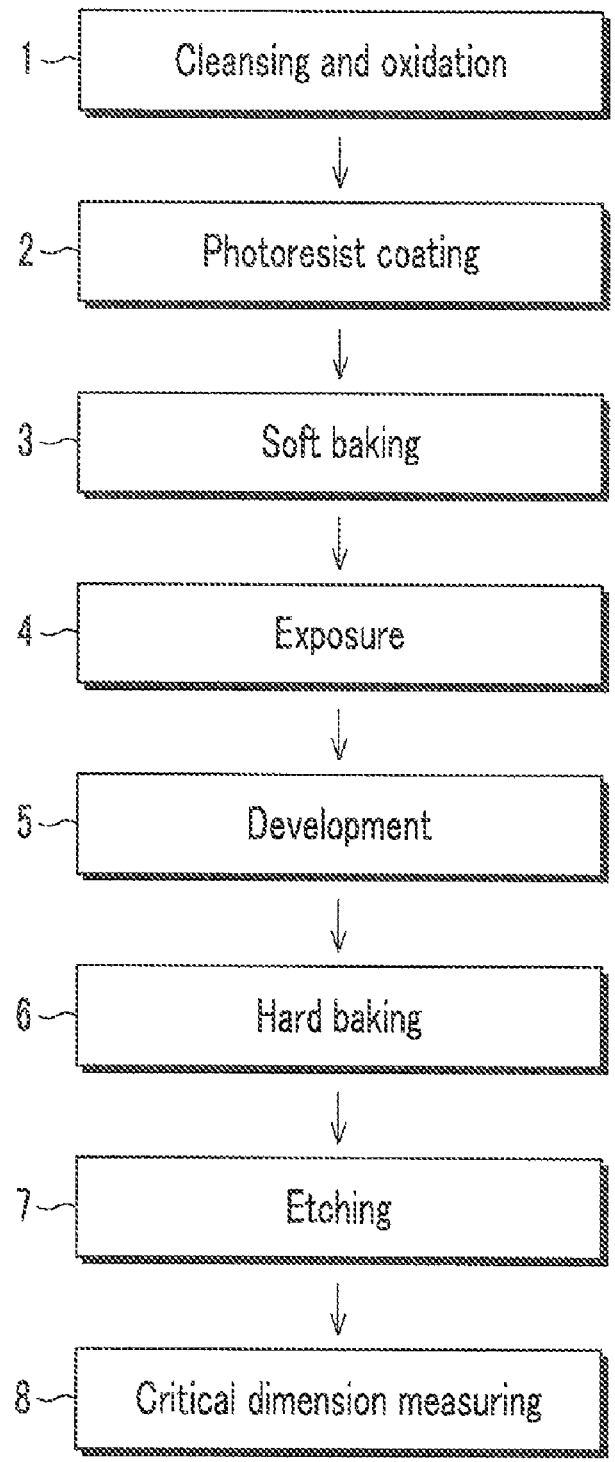
FIG. 4 is a flow chart illustrating a photolithography process.

FIG. 4 is a flow chart illustrating a photolithography process. The photolithography process includes a cleansing and oxidation process 1 for a semiconductor substrate, a photoresist coating process 2, a soft baking process 3, an exposure process 4, a development process 5, a hard baking process 6, an etching process 7, and a critical dimension measuring process 8.

In the cleansing and oxidation process 1 for the semiconductor substrate, an organic material on a wafer surface is removed by an acetone solution, and the acetone solution is removed by a methanol solution. Afterwards, the wafer is cleaned and dried by using distilled water. Oxygen or vapor of about 800° C.-1200° C. is chemically reacted with the wafer surface to form a thin and uniform silicon oxide ($SiO_2$) layer.

In the photoresist coating process 2, a layer of photoresist solution is coated on the wafer surface.

In the soft baking process 3, 80-90% of a solvent in the photoresist solution is evaporated by heat energy to form and maintain a solid photoresist film state.

In the exposure process 4, light passes through a circuit pattern formed in a mask to form a picture of the circuit pattern on the wafer on which the photoresist layer is formed. That is, a portion of the photoresist layer is irradiated by the light, while the remaining portion of the photoresist layer is not irradiated by the light.

In the development process 5, a developing solution is sprayed on the wafer to remove the portion of the photoresist layer irradiated by the light in the exposure process, and to maintain the remaining portion of the photoresist layer where the light is not irradiated.

in the hard baking process 6, the remaining portion of the photoresist solution is dried and hardened by heat of 120° C. degrees to enhance the formed circuit pattern.

In the etching process 7, the wafer on which the remaining portion of the photoresist solution is formed, is etched by an etching solution. As a result, a desired portion of the wafer is maintained and the other portion is removed to form a wire on the wafer.

As described above, the photolithography process includes a plurality of processes, and the critical dimension controlling process is executed after the photolithography process.

Measuring tool 30 is a piece of equipment used for obtaining measurement data from the semiconductor wafer produced by the production process. Examples of measuring tool 30 include an ellipsometer that measures the thickness of a thin film, an elcometer that measures the thickness of a coated layer, and a quartz crystal sensor that measures the deposition speed of a deposition material. Measuring tool 30 transmits the obtained measurement data to controller 40.

Controller 40 controls the operation of process tool 20 and measuring tool 30, calculates a final critical dimension based on the measurement data obtained from measuring tool 30, and transmits the final critical dimension to process tool 20 to control an offset of process tool 20. Controller 40 controls the critical dimension controlling process in the production process.

Memory 50 stores the offset per model of the semiconductor, a process variation, and a critical dimension.

Now, a method for controlling a critical dimension in the production process of the semiconductor manufacturing line will be described.

Figure 2:
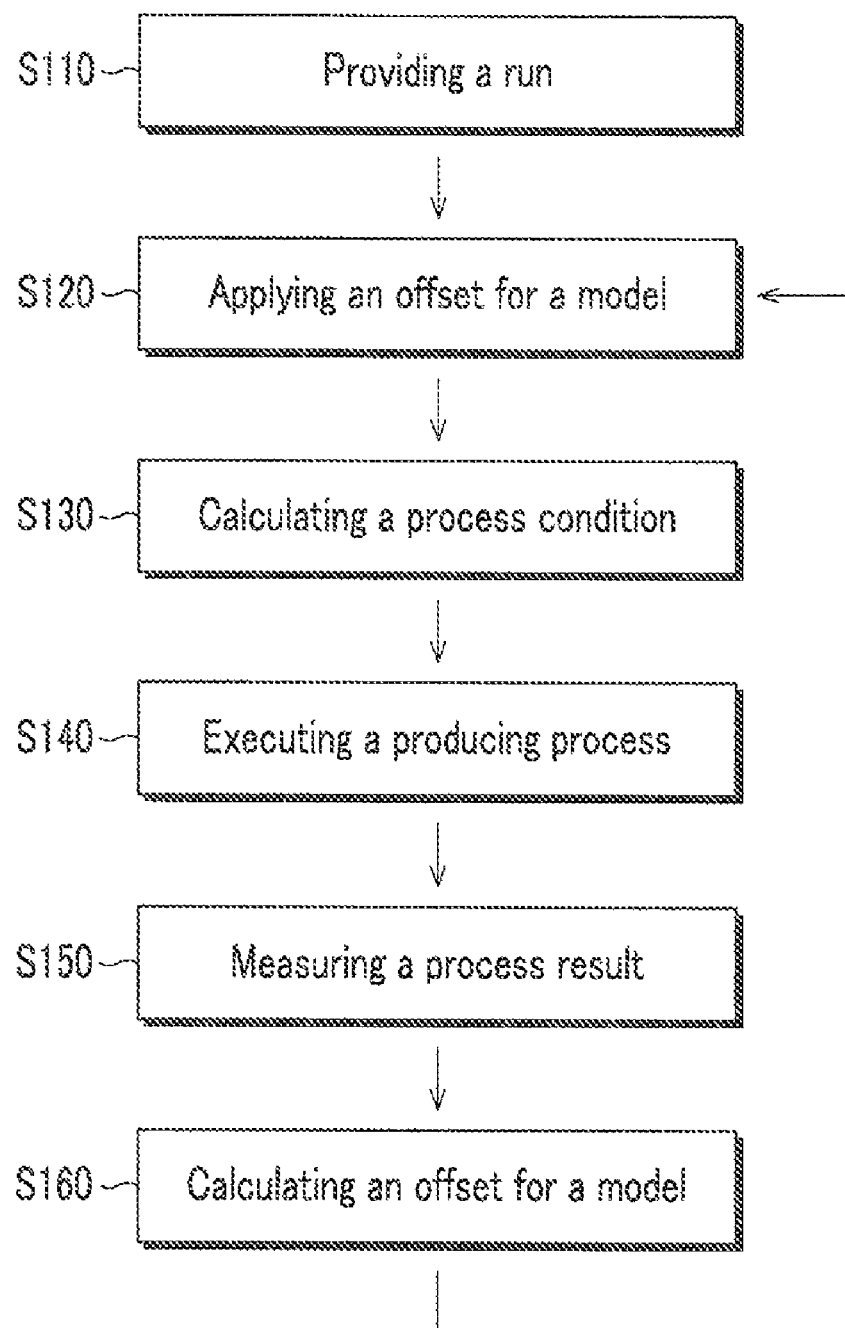
FIG. 2 is a flowchart of a critical dimension controlling method in a continuous production process as an exemplary embodiment according to the principles of the present invention.

FIG. 2 is a flowchart of a critical dimension controlling method in a continuous production process as an exemplary embodiment according to the principles of the present invention.

Referring to FIG. 2, a run 10 is provided to a process tool 20 in the continuous production process (S110). The continuous production process means a production process in which the runs for the same process model is continuously provided and processed.

In the production process, an offset for the process model of the semiconductor run 10 to be processed is determined and applied (S120). The offset of the model is determined according to the size of the semiconductor wafer in run 10, a performance requirement condition, and a critical dimension. Controller 40 may confirm the offset of the model in the memory 50. In the continuous production process, an initial offset is applied to the run that is initially provided, and the offset calculated according to the critical dimension measurement of the current run is applied to the following run.

A required process condition is determined according to the environment of the production process (S130). The required process condition may be different for different process model of the semiconductor. Controller 40 calculates a process variation reflecting the process condition according to the model of the semiconductor. Controller 40 transmits the offset and the process variation for the model of the semiconductor to process tool 20.

Process tool 20 executes the production process in dependence upon the offset and process variation for the model (S140). The production process may be represented as a relationship between the critical dimension, and the process variation and the offset. The critical dimension includes an actual critical dimension of the semiconductor produced as a result of the performance of the production process and a target critical dimension for the semiconductor model.

Equation 1 represents the critical dimension represented by the relationship of n process variations and the offset in the n-th production process for the n-th run (n is an integer, and n>0).

$$\theta = \alpha_1 \times k_1 + \ldots + \alpha_n \times k_n + \beta \quad \text{(Equation 1)}$$

Here, $\theta$ is the critical dimension, $\alpha_n$ is a process variation for the n-th run, $k_n$ is a coefficient for the n-th run, and $\beta$ is the offset.

Measuring tool 30 measures the actual critical dimension of the semiconductor produces as a result of the production process and transmits the measured result to controller 40 (S150). In other words, the actual critical dimension of the semiconductor produced as the production process result is measured, and the measured actual critical dimension is transmitted to controller 40.

Controller 40 calculates the offset for the model based on the measured actual critical dimension (S160). The calculated offset may be represented by Equation 2.

$$\beta' = \theta_{measure} - (\alpha_1 \times k_1 + \ldots + \alpha_n \times k_n) \quad \text{(Equation 2)}$$

Here, $\beta'$ is the calculated offset, and $\theta_{measure}$ is the measured actual critical dimension. For example, the initial offset may reflect an initial constant such as a reticle design value and a reticle manufacturing error, and the calculated offset may reflect measuring noise or a steep or gradual process change.

Controller 40 writes the measured actual critical dimension and the calculated offset to memory 50. Also, the calculated offset may be recalculated as a new offset with reference to the previous offset history.

Controller 40 applies the most recently calculated offset or the new offset referring to the offset history to calculate the process variations satisfying the target critical dimension if the next run is inserted into the process tool 20.

Equation 3 represents the process variations satisfying the target critical dimension from the calculated offset or the new offset referring the offset history.

$$\alpha_1' \times k_1 + \ldots + \alpha_n' \times k_n = \theta_{target} - \beta' \quad \text{(Equation 3)}$$

Here, $\theta_{target}$ is the target critical dimension, and $\alpha'$ is the process variation satisfying the target critical dimension.

The process variation satisfying the target critical dimension becomes the process condition in the production process of the new run. That is, the process variation satisfying the target critical dimension is fed back into the production process of the next run.

As described above, the actual critical dimension $\theta_{measure}$ is measured to calculate the offset $\beta$ in the production process of the first run, and the difference between the target critical dimension $\theta_{target}$ and the calculated offset is applied to determine the process variation $\beta'$ of the production process of the second run. The feedback of the process condition may be applied as a recipe unit of the process tool or a reticle unit as well as the run unit.

The feedback of the process condition is performed so that the actual critical dimension of the semiconductor produced in the continuous production process is close to the target critical dimension, thereby increasing the product yield.

When the continuous production process is not executed and a discontinuous production process is executed, however, the change of the process condition generated in the discontinuous production process is not reflected to the continuous production process such that the difference between the target critical dimension and the actual critical dimension may be temporary increased.

Next, a method for always reflecting the change of the process condition generated in a hybrid production process including the discontinuous production process and the continuous production process will be described.

Figure 3:
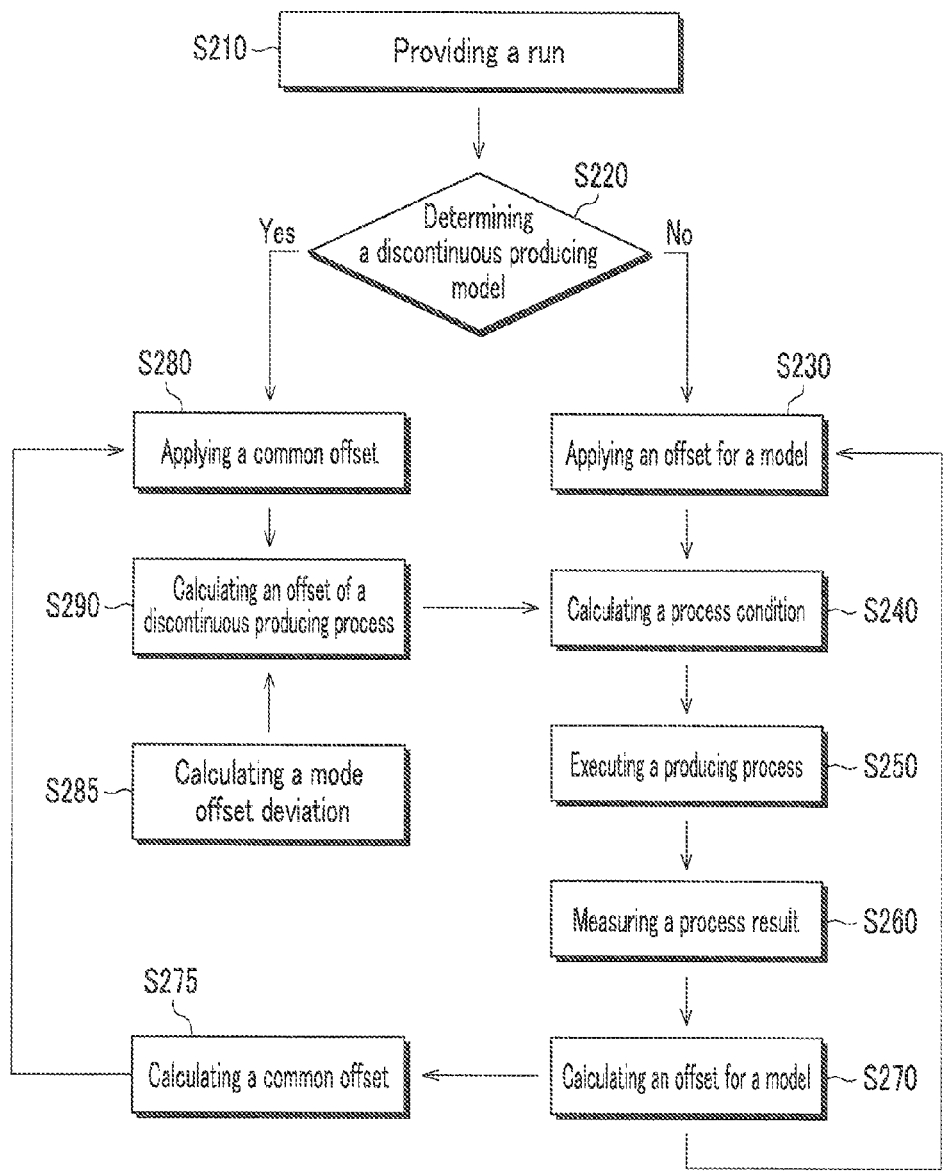
FIG. 3 is a flowchart of a critical dimension controlling method in a hybrid production process as an exemplary embodiment according to the principles of the present invention.

FIG. 3 is a flowchart of a critical dimension controlling method in the hybrid production process as an exemplary embodiment according to the principles of the present invention.

Referring to FIG. 3, if a run is inserted in the process tool 20 (S210), the controller 40 determines whether the run is for a model for which the discontinuous production process is executed (S220). The execution of the discontinuous production process may be determined with reference to the time interval between the runs for a specific production model. Also, the execution of the discontinuous production process may be determined with reference to whether the change of the common offset is largely increased by more than a predetermined degree.

When the run is not for a model undergoing the discontinuous production process, the critical dimension controlling method in the continuous production process as described in FIG. 2 is executed.

in the continuous production process, an offset for the model is applied (S230), and the process variation reflecting the process condition is calculated (S240). The production process reflecting the offset for the model and the process variation is executed (S250). The production process may be represented by Equation 1.

As a result of the production process, the actual critical dimension is measured (S260), and the offset for the model is calculated based on the actual critical dimension (S270). The calculated offset for the model may be represented by Equation 2.

For the next continuos production process, the calculated offset for the model is applied such that the process variation satisfying the target critical dimensions is calculated as in Equation 3. The calculated process variation becomes the process condition in the next continuous production process.

Also, the calculated offset for the model in the continuous production process is applied to the calculation of a common offset for the discontinuous production process (S275). In the present specification and the pending claims, a group of models may be used to produce a like layer or a like element having a like target critical dimension. In the discontinuous production process, for a group of models, the process included in the same group may be determined by the same offset, and this same offset is referred to as a common offset. Also, the difference between an offset of a reference model that is the reference in the same group and an offset of each model is referred to as a model offset deviation. Each model in the group has a corresponding model offset deviation. The model offset deviation may be calculated in controller 40 and may be written in memory 50.

The common offset is calculated according to the model offset deviation of each model and the offset for the model calculated in the continuous production process.

Equation 4 represents the model offset deviation.

$$d\beta = \beta_{ref} - \beta \quad \text{(Equation 4)}$$

Here, $d\beta$ is the model offset deviation, $\beta_{ref}$ is the offset of the reference model, and $\beta$ is the offset of each model, which is previously defined.

Equation 5 represents the common offset.

$$\beta_{com} = \beta' - d\beta \quad \text{(Equation 5)}$$

Here, $\beta_{com}$ is the common offset, and $\beta'$ is the offset for the model calculated in the continuous production process.

The common offset is calculated whenever the semiconductor runs for the models inside the group are inserted and produced in the production process, and is stored in memory 50. That is, controller 40 calculates the common offset whenever the semiconductor runs for the models inside the group are inserted and processed in the production process, and writes the calculated common offset to the memory 50.

When a model for which the discontinuous production process is executed after the run is inserted, the common offset stored in the memory 50 is applied (S280). Also, the model offset deviation $d\beta$ of the corresponding model is calculated according to Equation 4 (S285).

Controller 40 calculates the offset of the discontinuous production process according to the common offset and the model offset deviation (S290).

Equation 6 represents the offset of the discontinuous production process.

$$\beta_{single} = \beta_{com} + d\beta \quad \text{(Equation 6)}$$

Here, $\beta_{single}$ is the offset of the discontinuous production process, $\beta_{com}$ is the common offset, and $d\beta$ is the model offset deviation.

The offset of the discontinuous production process is reflected to the process condition calculation.

As described above, the change of the process condition generated when the discontinuous production process is executed may be reflected to the continuous production process.

On the other hand, in the continuous production process in which the runs are inserted with a relatively short interval between the runs, the offset of the discontinuous production process may reflect the process condition when the change of the common offset is generated to be larger than a predetermined value, in this case, the threshold value may be rapidly applied to the change of the production process.

Although a plurality of models having critical dimensions with different targets undergo the continuous or the discontinuous production process, the change of the previous process is reflected to obtain an optimized process condition such that the error along with the critical dimension may be minimized, thereby reducing the time and the cost generated in the initial period when a production is restarted.

The critical dimension controlling method in the above-described production process may be coded into the command of the computer program controlling process tool 20 and measuring tool 30, and the command code of the computer program may be written to the storing medium.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: ran
20: process tool
30: measuring tool
40: controller
50: memory

What is claimed is:

1. A critical dimension controlling method in a semiconductor production process, comprising:
    determining whether a model is to undergo a discontinuous production process when a run is inserted in a semiconductor manufacturing line;
    applying an offset for said model or a common offset for a model group including said model according to the determination;
    executing a production process in dependence upon a process variation along with the offset for the model or the common offset for the model group; and
    measuring an actual critical dimension in the production process,
    the offset for the model is calculated based on a previously measured actual critical dimension, and the calculated offset for the model is applied to the calculation of the common offset for the model group.

2. The critical dimension controlling method of claim 1, wherein the common offset is calculated by a difference between the calculated offset for the model and a model offset deviation.

3. The critical dimension controlling method of claim 2, wherein the model offset deviation is calculated by a difference between an offset of a reference model in the model group and the offset for said model.

4. The critical dimension controlling method of claim 3, further comprising calculating an offset for the discontinuous production process in dependence upon the common offset and the model offset deviation.

5. The critical dimension controlling method of claim 4, wherein the offset for the discontinuous production process is calculated as the sum of the common offset and the model offset deviation.

6. The critical dimension controlling method of claim 1, wherein the model group is a group of models producing a same layer or a same element having a same target critical dimension in the discontinuous production process.

7. The critical dimension controlling method of claim 1, wherein the determination of whether the model is to undergo the discontinuous production process is performed with reference to a time interval between the insertion of the run and an insertion of a previous run.

8. The critical dimension controlling method of claim 1, further comprising storing the measured actual critical dimension and the calculated offset for the model in a memory.

9. The critical dimension controlling method of claim 1, wherein the process variation is calculated in dependence upon the calculated offset for the model and a target critical dimension.

10. A semiconductor manufacturing line, comprising:
- a process tool executing a semiconductor production process;
- a measuring tool obtaining measurement data in a process result of semiconductor production process; and
- a controller controlling the process tool and the measuring tool,
- the controller determines whether a model is to undergo a discontinuous production process when a run is inserted in a semiconductor manufacturing line, and applies an offset for the model or a common offset for a model group including said model, according to the determination,
- to the offset for the model is calculated based on a previously obtained measurement data, and the calculated offset for the model is applied to the calculation of the common offset for the model group.

11. The semiconductor manufacturing line of claim 10, wherein the controller calculates the common offset by a difference between the calculated offset for the model and a model offset deviation.

12. The semiconductor manufacturing line of claim 11, wherein the controller calculates the model offset deviation by a difference between an offset of a reference model in the model group and the offset for said model.

13. The semiconductor manufacturing line of claim 12, wherein the controller calculates an offset for the discontinuous production process as the sum of the common offset and the model offset deviation.

14. The semiconductor manufacturing line of claim 10, wherein the controller determines whether the model is to undergo the discontinuous production process with reference to a time interval between the insertion of the run and an insertion of a previous run.

15. The semiconductor manufacturing line of claim 10, wherein
- the controller calculates a process variation satisfying a target critical dimension in dependence upon the calculated offset for the model and the target critical dimension, and
- the process tool executes the semiconductor production process in dependence upon the process variation.

16. The semiconductor manufacturing line of claim 10, further comprising a memory storing the measurement data and the calculated offset for the model.

* * * * *